United States Patent

Kodama

[19]

[11] Patent Number: 5,982,359
[45] Date of Patent: Nov. 9, 1999

[54] MEMORY DEVICE FOR STORING 9-BIT VIDEO DATA FORMED OF 8-BIT VIDEO AND 1-BIT COLOR FRAME INFORMATION, THE LATTER BEING CONVERTED TO 8-BIT DATA

[75] Inventor: Takafumi Kodama, Kanagawa, Japan

[73] Assignee: Sony Corporation, Tokyo, Japan

[21] Appl. No.: 09/009,454

[22] Filed: Jan. 20, 1998

[30] Foreign Application Priority Data

Jan. 22, 1997 [JP] Japan ..................................... 9-009513

[51] Int. Cl.⁶ ....................................................... G09G 5/00
[52] U.S. Cl. ........................... 345/197; 365/219; 345/507
[58] Field of Search ..................................... 345/507, 509, 345/515, 197; 365/80, 83, 219, 189.12; 360/1, 13, 27, 55; 369/13, 47, 48, 83

[56] References Cited

U.S. PATENT DOCUMENTS

| | | |
|---|---|---|
| 5,086,388 | 2/1992 | Matoba et al. ........................... 365/219 |
| 5,434,723 | 7/1995 | Aoki ........................................... 360/70 |
| 5,448,544 | 9/1995 | Tsuchinaga et al. ...................... 360/59 |
| 5,508,967 | 4/1996 | Karino ..................................... 365/219 |
| 5,621,472 | 4/1997 | Kannapell et al. ...................... 348/505 |
| 5,689,438 | 11/1997 | Goh ......................................... 395/873 |

*Primary Examiner*—Kee M. Tung
*Attorney, Agent, or Firm*—Frommer, Lawrence & Haug, LLP.; William S. Frommer

[57] ABSTRACT

A memory device for recording input 9-bit data comprised of 8-bit video data including a predetermined invalid period and 1-bit color frame information data. A serial-to-parallel converter converts a valid data part of the 1-bit color frame information data to 8-bit data. The video data of the input data is selected when the video data is valid and the 8-bit color frame information is selected when the video data is invalid and 8-bit color frame information data is present. A memory stores the selected 8-bit data.

10 Claims, 8 Drawing Sheets

FIG. 2A  HD
FIG. 2B  VIDEO DATA (8 BITS)
FIG. 2C  CFI (1 BIT)

FIG. 3

| 0 | CF2 (COLOR FRAME 2) |
|---|---|
| 1 | CF1 (COLOR FRAME 1) |
| 2 | CF0 (COLOR FRAME 0) |
| 3 | H : COMPOSITE/L : COMPONENT |
| 4 | H : VIDEO INDEX ERROR |
| 5 | H : VIDEO INDEX LINE |
| 6 | H : VIDEO ANCILLARY ERROR |
| 7 | H : VIDEO ANCILLARY LINE |
| 8 | H : 16 : 9 |
| 9 | H : RECORDING ENABLE |
| 10 | H : IMAGE SWITCH |
| 11 | H : FRAME DELAY |
| 12 | BPI[2] |
| 13 | BPI[1] |
| 14 | BPI[0] |
| 15 | GOP FRAME NUMBER[4] |
| 16 | GOP FRAME NUMBER[3] |
| 17 | GOP FRAME NUMBER[2] |
| 18 | GOP FRAME NUMBER[1] |
| 19 | GOP FRAME NUMBER[0] |

FIG.6B VIDEO DATA (8 BITS)

FIG.6C CFI SIGNAL

FIG.6D OUTPUT OF FIRST LATCH

FIG.6E TIMING PULSE (SELECTION SIGNAL)

FIG.6F VIDEO DATA INTO WHICH CFI IS INSERTED (8 BITS)

X : Don't Care

FIG. 7

FIG. 8A DATA READ FROM MEMORY (8 BITS)

FIG. 8B VIDEO DATA OUTPUT (8 BITS)

FIG. 8C CFI OUTPUT

REARRANGE AND USE AS 1 BIT DATA

X : Don't Care

MEMORY DEVICE FOR STORING 9-BIT VIDEO DATA FORMED OF 8-BIT VIDEO AND 1-BIT COLOR FRAME INFORMATION, THE LATTER BEING CONVERTED TO 8-BIT DATA

BACKGROUND OF THE INVENTION

1. Field of the Invention

The present invention relates to a memory device for recording 9-bit length video data preferred when used for reproducing video data at variable speeds in for example a video server device.

2. Description of the Related Art

Along with the advances in recording technology and image processing technology, A/V server devices which encode large amounts of video data and record them in a randomly accessible recording medium to enable the data to be easily and efficiently edited and transmitted.

One of most basic functions in such an A/V server device is the variable speed reproduction of video data. This is utilized for various purposes such as editing, viewing, and confirmation of video data. Usually, variable speed reproduction is carried out by writing the decoded reproduction video signal in a memory in units of frames and reading and reproducing any of the data in the memory in units of fields in accordance with the reproduction speed.

At this time, the data which is written into and read out from the memory is a total 9-bit length data comprised of the main 8-bit video data and a CFI signal, that is, a 1-bit serial signal which has color frame information of this video data and which is transmitted together with the main video data between principal ICs for processing.

The reason why the CFI signal is necessary in addition to the main video data as the data written into and read out from the memory at the time of such variable speed reproduction will be explained next.

In the video signal, the start point of the valid picture is different between the first field comprising one picture, that is, one frame, and the second field. When taking note of the vertical time direction of this, there is a deviation of one line.

In standard speed normal reproduction, smooth pictures are reproduced by sequentially and regularly outputting the picture of the first field at the timing at which the picture of the first field should be output and then the picture of the second field at the timing at which the picture of the second field should be output.

At the time of variable speed reproduction, however, the data is reproduced in units of fields (field reproduction), so the pictures of the first field and the second field are not always sequentially and regularly output as in standard speed reproduction. That is, it is necessary to output the picture of the second field at the timing at which the picture of the first field should be output and, conversely, output the picture of the first field at the timing at which the picture of the second field should be output.

If the data were to be output without any processing at this time, since, as explained above, there is a deviation of one line in the start points of the pictures in the vertical time direction between the first field and the second field, this amount of shimmy will occur in the vertical direction in the output pictures.

The CFI signal includes, other than the color frame information of the main video data, information indicating the first field or second field (CF0). Therefore, by transmitting this CFI signal together with the video data to the principal ICs, it becomes possible for each IC to carry out the required processing for outputting smooth pictures based on this information.

In general, however, the data which is input and output in a memory IC generally consists of 8 to 16 bits. For this reason, when, as in the memory device explained above, the data to be written into or read out from the memory consists of 9 bits, the video data cannot be efficiently recorded. Namely, when such a memory is used, the input or output of the data requires either use of two 8-bit memory ICs or one 16-bit memory IC. In either case, the remaining 7 bits worth of memory space becomes wasted, so there was a disadvantage of expensive cost. Further, the number of memory ICs used is increased in comparison with the required storage capacity, so there also existed the disadvantage of the increase of size of the device.

SUMMARY OF THE INVENTION

An object of the present invention is to provide a memory device that can efficiently record and reproduce 9-bit video data by using commonly used memory ICs with 4-bit, 8-bit or 16-bit length input/output data.

To achieve the above object, there is provided a means for processing 9-bit data into 8-bit data so as to enable the data to be written into a memory with 8-bit input/output data. Further, there is provided a means for converting the 8-bit data read out from this memory to the original 9-bit data so as to restore the original 9-bit data for transmission.

According to the present invention, there is provided a memory device for recording 9-bit data including 8-bit video data having a predetermined invalid period and 1-bit color frame information data, comprising a serial-to-parallel converting means for converting a valid data part of the 1-bit color frame information data to 8-bit data, a recording data selecting means for selecting the 8-bit video data when the video data is valid and selecting the converted 8-bit color frame information data when the video data is invalid and the converted 8-bit color frame information data exists, a memory means for storing the selected 8-bit data wherein data width for inputting and outputting is a whole multiple of 8 bits, a reproducing means for reproducing the 8-bit data stored in the memory means, a parallel-to-serial converting means for converting the reproduced 8-bit data to a substantially 1-bit data train, and a 9-bit data generating means for adding the converted 1-bit data train to the corresponding 8-bit video data when the converted 1-bit data train is the valid data part of the color frame information data.

Preferably, the memory device having the serial-to-parallel converting means comprising a shift register means for shifting successively and storing the 1-bit color frame information data having seven 1-bit memory means or more connected in series, and a data extracting means for extracting predetermined continuous 8 bits from the 1-bit color frame information data input to the shift register means or stored in the shift register means.

Preferably, the recording data selecting means detects a valid period and an invalid period of the 8-bit video data based on a horizontal synchronization signal of the 8-bit video data and carries out the selection based on the detected periods.

Preferably, the recording data selecting means comprises a counter for detecting the elapsed time from the transforming of a horizontal synchronization signal of the 8-bit video data and detects the time when the video data is invalid and the converted 8-bit color frame information data exists based on the detected elapsed time.

Preferably, the parallel-to-serial converting means comprises a shift register means for shifting successively and storing the reproduced 8-bit data having seven 8-bit memory means or more connected in series, and a data extracting means for extracting predetermined 1-bit data from each of predetermined continuous eight 8-bit data input to the shift register means or stored in the shift register means and generating 1-bit data train.

Preferably, the 9-bit data generating means detects a valid data part of the color frame information data based on a horizontal synchronization signal of the video data and adds the detected valid data part to the video data.

Preferably, the color frame information data includes the information indicating the field of the video data.

Preferably, the memory means constituted by synchronous DRAMs.

According to the present invention, there is provided a memory device for recording 9-bit data including 8-bit video data having a predetermined invalid period and 1-bit color frame information data, comprising a serial-to-parallel converting means for converting a valid data part of the 1-bit color frame information data to 8-bit data, a recording data selecting means for selecting the 8-bit video data when the video data is valid and selecting the converted 8-bit color frame information data when the video data is invalid and the converted 8-bit color frame information data exists, and a memory means for storing the selected 8-bit data wherein data width for inputting and outputting is a whole multiple of 8 bits.

According to the present invention, there is provided a memory device comprising a memory means for storing 1-bit color frame information data of which valid data part is converted to 8-bit data and multiplexed to 8-bit video data in the invalid data part of the same wherein data width for storing and reproducing is a whole multiple of 8 bits, a reproducing means for reproducing the 8-bit data stored in the memory means, a parallel-to-serial converting means for converting the reproduced 8-bit data to a substantially 1-bit data train, and a 9-bit data generating means for adding the converted 1-bit data train to the corresponding 8-bit video data when the converted 1-bit data train is the valid data part of the color frame information data.

BRIEF DESCRIPTION OF THE DRAWINGS

These and other objects and features of the present invention will become more apparent from the following description of the preferred embodiments given with reference to the attached drawings, wherein:

FIGS. 6A to 6F are timing charts for explaining the operation of the writing unit shown in FIG. 4, in which FIG. 6) is a timing chart showing the input video data.

FIGS. 8A to 8C are timing charts for explaining the operation of the reading unit shown in FIG. 4, in which

DESCRIPTION OF THE PREFERRED EMBODIMENTS

An explanation will be made of a memory device of an embodiment of the present invention by referring to the drawings.

First of all, an explanation will be made of the video data to be recorded in the memory device of the present embodiment by referring to FIG. 1A to FIG. 3.

This video data is data comprised by 9 bits in total, that is, the main 8-bit video data and a 1-bit serial signal which has color frame information of the video data and is transmitted together with the main video data between for example principal ICs for processing, that is, a CFI signal.

Figure 1A:
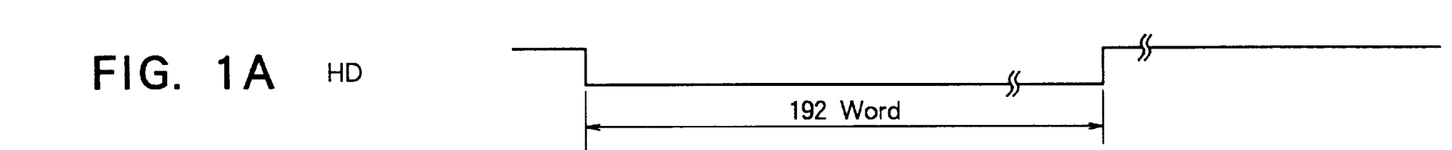
FIGS. 1A to 1C are timing charts showing the relationship among a horizontal synchronization signal HD, 8-bit video data, and 1-bit CFI signal in a 525/60 system.
Figure 1B:
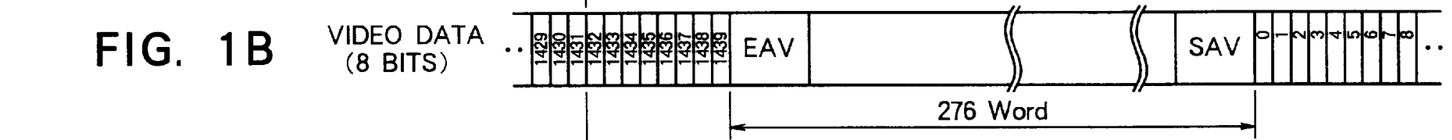
Figure 1C:
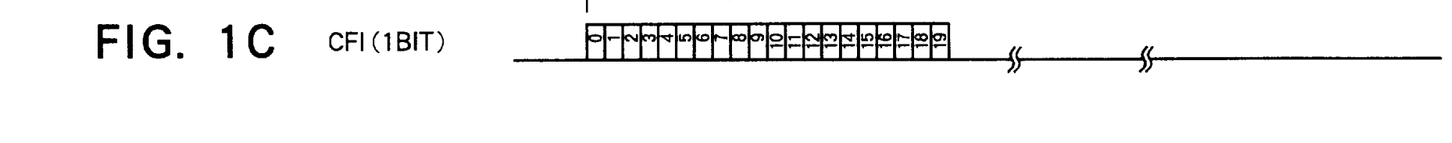

FIGS. 1A to 1C are timing charts showing the relationship among a horizontal synchronization signal HD (Horizontal Drive) (FIG. 1A), 8-bit video data (FIG. 1B), and 1-bit CFI signal (FIG. 1C) in a 525/60 system.

Figure 2A:
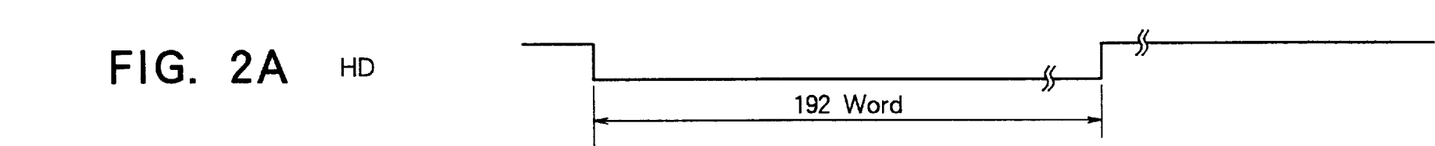
FIGS. 2A to 2C are timing charts showing the relationship among the horizontal synchronization signal HD, 8-bit video data, and 1-bit CFI signal in a 625/50 system.
Figure 2B:
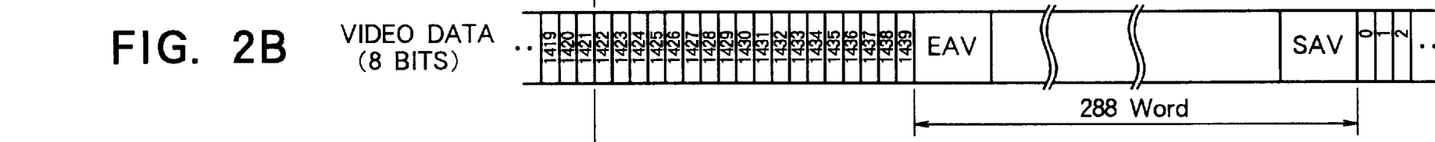
Figure 2C:
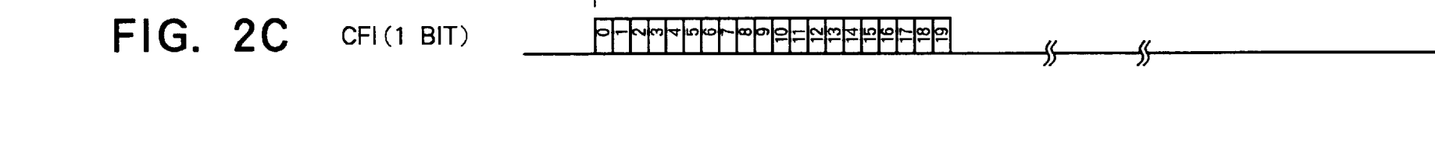

FIGS. 2A to 2C are timing charts showing the relationship among the horizontal synchronization signal HD (Horizontal Drive) (FIG. 2A), 8-bit video data (FIG. 2B), and 1-bit CFI signal (FIG. 2C) in a 625/50 system.

In FIGS. 1A to 1C and FIGS. 2A to 2C, EAV (End of Active Video) shows an end point of the valid image data, and SAV (Start of Active Video) shows a start point of the valid image data. Accordingly, the 276 words or 288 words from EAV to SAV constitute the substantially invalid period of the video data.

Further, as illustrated, in the CFI signal, the 20 bits from the trailing edge of the horizontal synchronization signal HD are valid and necessary data.

Figure 3:
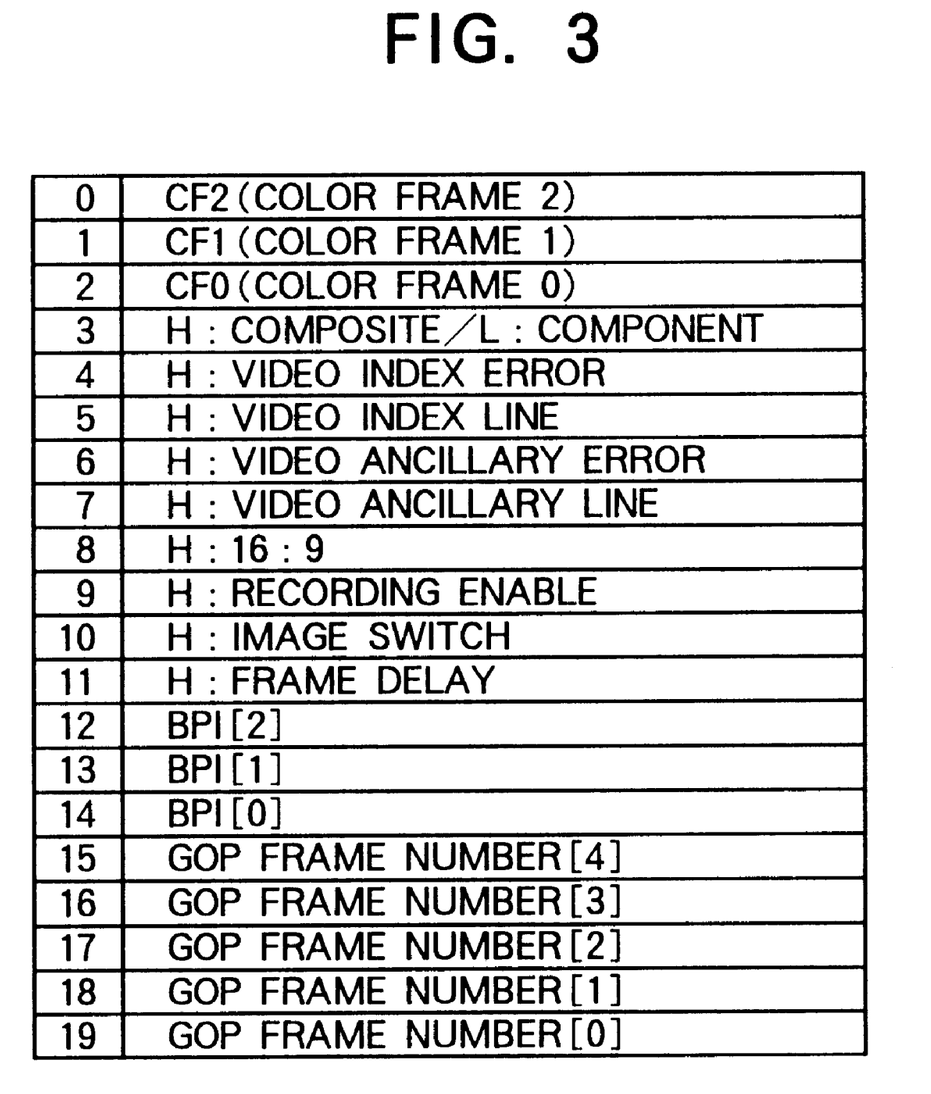
FIG. 3 is a view of the contents of the CFI signal shown in FIG. 1C and FIG. 2C.

The contents of the CFI signal are shown in FIG. 3.

The signal of a color frame 0 (CF0) of a bit 2 (third bit) of the CFI signal shown in FIG. 3 is the information indicating whether the field is the first field or the second field. Accordingly, by detecting the signal of this CF0, it can be determined whether the recorded video data is the video data of the first field or the video data of the second field. Namely, when variable speed reproduction such as two speed reproduction and three speed reproduction is carried out, the original field of the image data irregularly sampled for the variable speed reproduction can be determined from this. As a result, the processing necessary for determining the relationship between the field and a field required for actual display in a display unit and outputting smooth pictures can be carried out.

Next, an explanation will be made of a memory device of an embodiment of the present invention by referring to FIG. 4 to FIGS. 8A to 8C.

Figure 4:
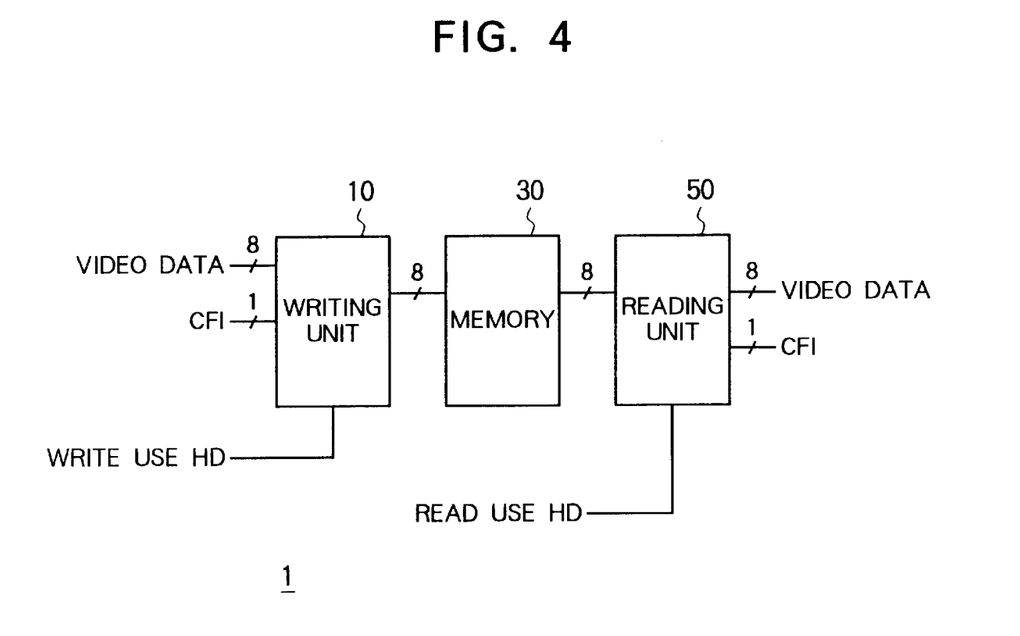
FIG. 4 is a block diagram of the configuration of a memory device of an embodiment of the present invention.

FIG. 4 is a block diagram of the configuration of the memory device.

In order to carry out variable speed reproduction in a not illustrated A/V server device or the like, the memory device 1 records the video data read from a hard disk or other recording medium to enable the video data of a desired field to be selectively read.

Note that, in the following explanation, a case where video data of the 525/60 system is processed will be explained as an example.

The memory device 1 has a writing unit 10, a memory 30, and a reading unit 50.

The writing unit 10 is a data conversion unit for converting the input 9-bit data comprised of 8-bit video data and a 1-bit CFI signal to 8-bit data and recording the same in the memory 30.

The memory 30 is a synchronous 16-Mbit DRAM and can record about 24 frames of color video data.

The reading unit 50 is a data conversion unit for converting the data which was read from the memory 30 and converted to 8-bit data at the writing unit 10 to data comprised by 8-bit video data and a 1-bit CFI signal and outputting the same.

Below, a detailed explanation will be made of the writing unit 10 and reading unit 50 by referring to FIG. 5 to FIGS. 8A to 8C.

First, an explanation will be made of the configuration of the writing unit 10 by referring to FIG. 5.

Figure 5:
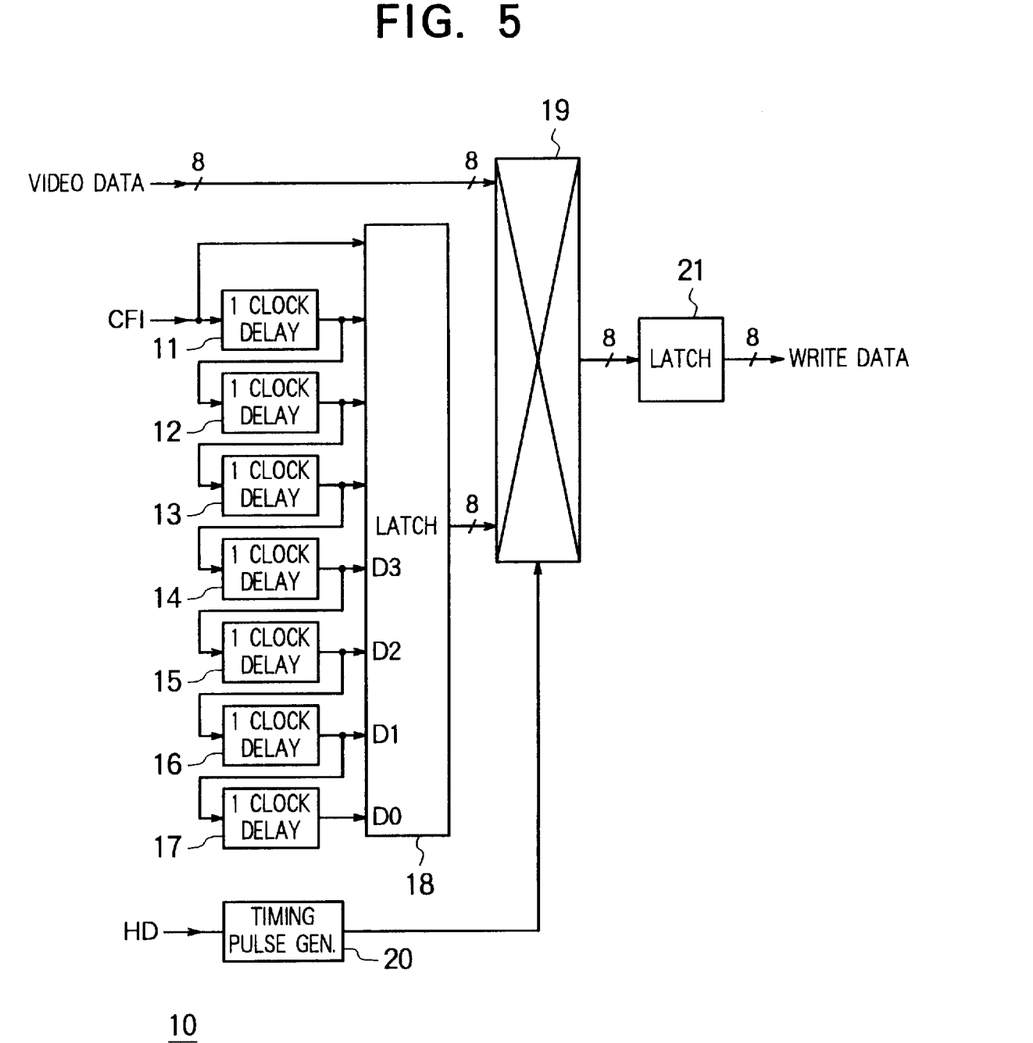
FIG. 5 is a detailed block diagram of the configuration of a writing unit shown in FIG. 4.

FIG. 5 is a block diagram of the configuration of the writing unit 10. The writing unit 10 has first to seventh delay elements 11 to 17, a first latch 18, a selector 19, a selection signal generator 20, and a second latch 21.

The first to seventh delay elements 11 to 17 are each comprised of 1-bit 1-clock delay elements. These first to seventh delay elements 11 to 17 are connected in series and substantially constitute a shift register. Namely, the output of the first delay element 11 becomes the input of the second delay element 12, the output of the second delay element 12 becomes the input of the third delay element 13, the output of the third delay element 13 becomes the input of the fourth delay element 14, the output of the fourth delay element 14 becomes the input of the fifth delay element 15, the output of the fifth delay element 15 becomes the input of the sixth delay element 16, and the output of the sixth delay element 16 becomes the input of the seventh delay element 1.

Further, the outputs of the first to seventh delay elements 11 to 17 are simultaneously output to the first latch 18.

Further, the CFI signal input to the writing unit 10 is input to the first delay element 11.

Due to such a configuration, the first to seventh delay elements 11 to 17 sequentially shift the input CFI signals and store signals up to seven clocks before. These seven clocks worth of CFI signals and the eight clocks worth of CFI signals of the CFI signals input to the writing unit 10 are input as 8-bit signals to the first latch 18. Namely, the CFI signal which is sequentially input bit by bit is converted to an 8-bit parallel signal.

The first latch 18 receives as parallel input the eight CFI signals of the CFI signal input to the writing unit 10 and the seven CFI signals stored in the first to seventh delay elements 11 to 17. The first latch 18 latches and outputs them to the selector 19.

The selector 19 is a selection unit for selecting the data output as the data for storage in the memory 30. It selects either of the video data to be input to the writing unit 10 or the parallel-converted CFI signal input from the first latch 18 based on a selection signal input from the selection signal generator 20 mentioned later.

The selection signal generator 20 generates a selection signal for selecting the data in the selector 19 as mentioned before. The selection signal generator 20 generates a signal for selection of the output of the first latch 18 when the input video data has become invalid data and the input CFI signals are converted to a parallel format and recorded in the first latch 18 as 8-bit data and selection of the video data at other times. Specifically, the selection signal generator 20 is a pulse generator which counts the number of clocks from the trailing edge of the horizontal synchronization signal HD and generates a pulse for selection of the output of the first latch 18 when the predetermined number of clocks are counted.

The second latch 21 is a latch for temporarily storing the 8-bit data selected at the selector 19. The latched data is output to the memory 30 where it is stored.

Next, an explanation will be made of the operation of the writing unit 10 by referring to FIGS. 6A to 6F.

Figure 6A:
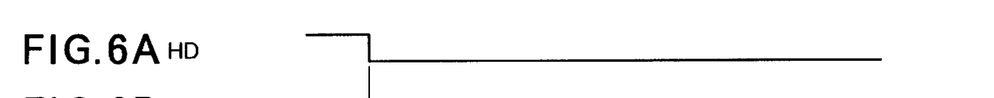
FIG. 6A is a timing chart showing the horizontal synchronization signal HD.
Figure 6B:
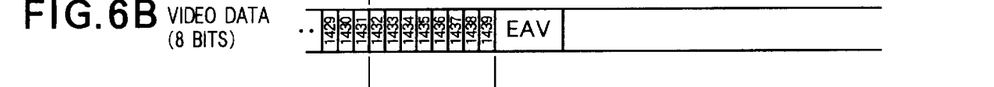
Figure 6C:
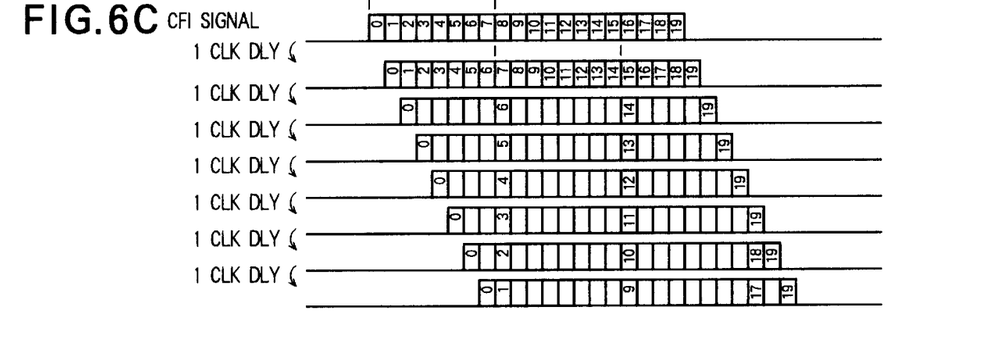
FIG. 6C is a timing chart showing the CFI signal which is input and stored in first to seventh delay elements.
Figure 6D:
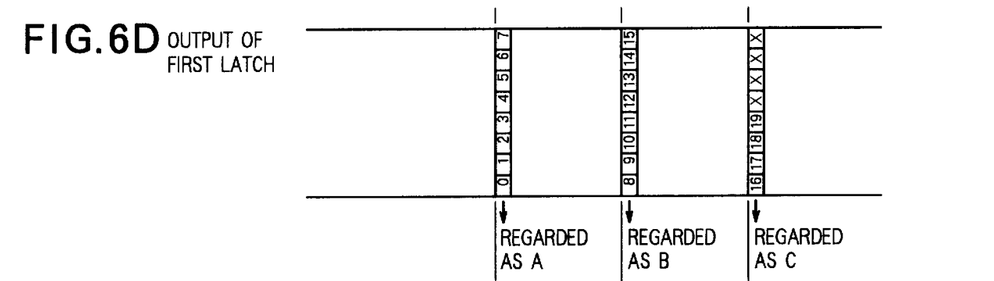
FIG. 6D is a timing chart showing 8-bit data latched by a first latch.
Figure 6E:
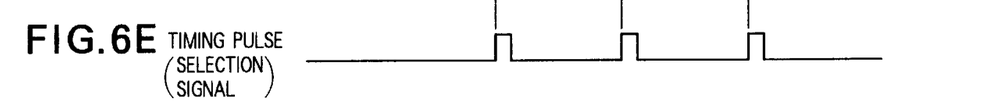
FIG. 6E is a timing chart showing a selection signal of a selector generated at a selection signal generator.
Figure 6F:
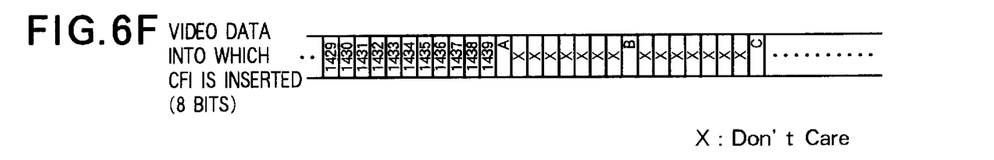
FIG. 6F is a timing chart showing the output of the writing unit, that is, the data recorded in the memory.

FIGS. 6A to 6F are timing charts for explaining the operation of the writing unit 10, in which FIG. 6A is a timing chart showing the horizontal synchronization signal HD; FIG. 6B is a timing chart showing the input video data; FIG. 6C is a timing chart showing the CFI signal which is input and stored in the first to seventh delay elements 11 to 17; FIG. 6D is a timing chart showing the 8-bit data latched by a first latch 18; FIG. 6E is a timing chart showing a selection signal of a selector 19 generated at a selection signal generator 20; and FIG. 6F is a timing chart showing the output of the writing unit 10, that is, the data recorded in the memory 30.

First, the writing unit 10 receives as input the horizontal synchronization signal HD shown in FIG. 6A, the video data shown in FIG. 6B, and the CFI signal shown in the uppermost part of FIG. 6C. As illustrated, in the CFI signal, the 20 bits from the trailing edge of the horizontal synchronization signal HD are valid and necessary data. Further, the video data becomes EAV and the valid period is ended when eight clocks elapse from the trailing edge of the horizontal synchronization signal HD.

The CFI signals input to the writing unit 10 are sequentially shifted at the first to seventh delay elements 11 to 17 as shown in FIG. 6C. At a point of time when the eighth CFI signal (data No. 7) is input, the first (data No. 0) to the seventh (data No. 6) CFI signals are stored in the first to seventh delay elements 11 to 17 and can be regarded as 8-bit data when adding the input eighth CFI signal (data No. 7). Then, this 8-bit data is latched at the first latch 18 as shown in FIG. 6D at the next clock.

In the signal of the 525/60 system, the valid region of the video data ends exactly at this time. Accordingly, the selection signal generator 20 generates a pulse for selection of the signal of the first latch 18 at this timing, that is, at the ninth clock from the trailing edge of the horizontal synchronization signal as shown in FIG. 6E. Note that, in the selection signal generator 20, after the generation of this pulse, the timing clock may be generated two times for every eight clocks, i.e., three times in total.

As a result, as shown in FIG. 6F, in the selector 19, the data of A shown in FIG. 6D is selected and inserted next to the 1440th video data (data No. 1439).

Thereafter, similarly, when the 16th CFI signal (data No. 16) is input, the ninth (data No. 8) to 16th (data No. 15) data combine as the input of the first latch 18 and are latched at the first latch 18, whereby the 8-bit data of B shown in FIG. 6D is generated.

Then, exactly at this time, a pulse for selection of the signal of the first latch 18 is generated from the selection signal generator 20, and the CFI signal converted to eight bits is selected at the selector 19 and inserted and output during the invalid period of the video data as shown in FIG. 6F.

Next, an explanation will be made of the configuration of the reading unit 50 by referring to FIG. 7.

Figure 7:
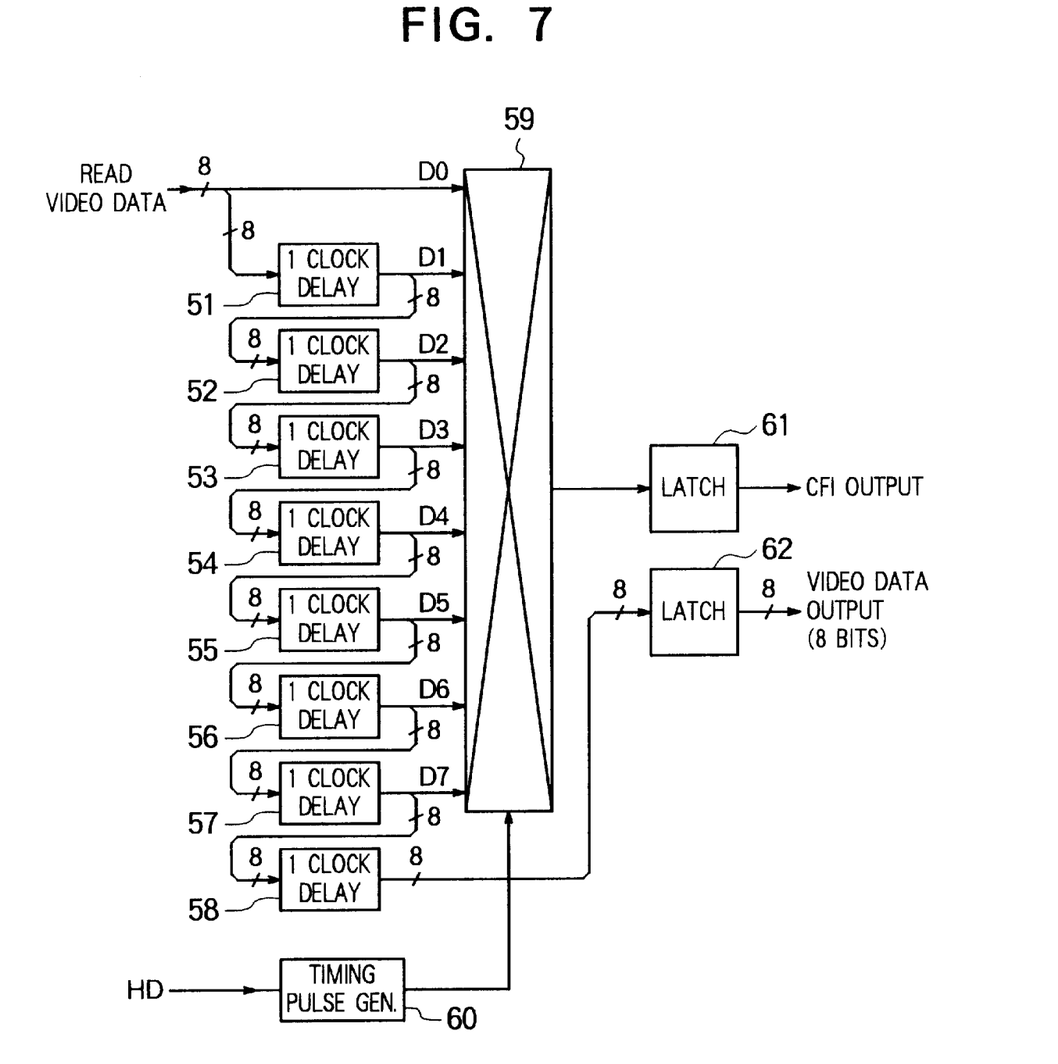
FIG. 7 is a detailed block diagram of the configuration of a reading unit shown in FIG. 4.

FIG. 7 is a block diagram of the configuration of the reading unit 50. The reading unit 50 has first to eighth delay elements 51 to 58, a selector 59, a selection signal generator 60, a first latch 61, and a second latch 62.

The first to eighth delay elements 51 to 58 are each comprised of 8-bit 1-clock delay elements. These first to eighth delay elements 51 to 58 are connected in series and substantially constitute an 8-bit 8-stage shift register. Namely, the output of the first delay element 51 becomes the input of the second delay element 52, the output of the second delay element 52 becomes the input of the third delay element 53, the output of the third delay element 53 becomes the input of the fourth delay element 54, the output of the fourth delay element 54 becomes the input of the fifth delay element 55, the output of the fifth delay element 55 becomes the input of the sixth delay element 56, the output of the sixth delay element 56 becomes the input of the seventh delay element 57, and the output of the seventh delay element 57 becomes the input of the eighth delay element 58.

The 8-bit data read from the memory 30 is input to the first delay element 51. Further, the output of the eighth delay element 58 is output to the second latch 62.

Specific bits of the data read from the memory 30 before being input to the first delay element 51 and of the outputs of the first to seventh delay elements 51 to 57 are respectively taken out and input to the selector 59. The specific bits are the bit 0 (LSB) for the input signal, the bit 1 for the first delay element 51, the bit 2 for the second delay element 52, the bit 3 for the third delay element 53, the bit 4 for the fourth delay element 54, the bit 5 for the fifth delay element 55, the bit 6 for the sixth delay element 56, and the bit 7 (MSB) for the seventh delay element 57.

The selector 59 is a selection unit for selecting the CFI signal which is to be output simultaneously in correspondence with the video data to be output, selects one of the specific bits extracted from the data read from the memory 30 and from the output data of the first to seventh delay elements 51 to 57 based on the selection signal input from the selection signal generator 20 mentioned later, and outputs the same to the first latch 61.

The selection signal generator 60 generates a selection signal for selecting the data in the selector 59 as mentioned before. In the selection signal generator 60, the selection signal is generated so that the corresponding CFI signal is simultaneously output with respect to the video data which was read from the memory 30 and delayed by eight clocks by the first to the eighth delay elements 51 to 58. Specifically, based on the horizontal synchronization signal HD corresponding to the video data output from the memory 30, a selection signal for sequentially repeatedly counting 0 to 7 is generated starting from the time when eight clocks elapse from the trailing edge thereof, that is, the time when the 1433rd video data (data No. 1432) is output as the output of the eighth delay element 58.

The first latch 61 is a latch for storing the CFI signal selected at the selector 59. The CFI signal is stored once in this first latch 61 and then output.

The second latch 21 is a latch for temporarily storing the video data output from the eighth delay element 58. The video data is stored once in this second latch 62 and then output.

Next, an explanation will be made of the operation of the reading unit 50 by referring to FIGS. 8A to 8C.

Figure 8A:
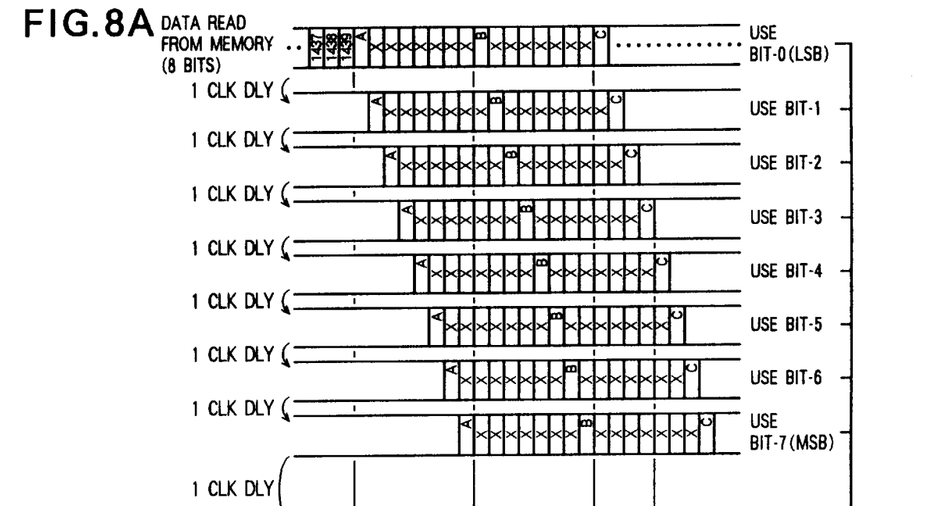
FIG. 8A is a timing chart showing the data which is read from the memory and input to the reading unit and data output from the first to seventh delay elements.
Figure 8B:
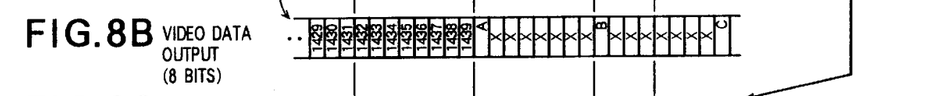
FIG. 8B is a timing chart showing the data output from an eighth delay element as the video data output.
Figure 8C:
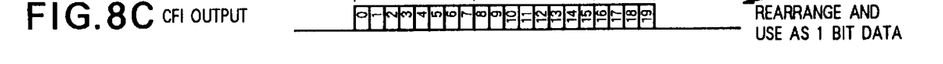
FIG. 8C is a timing chart showing the CFI signal output selected at the selector.

FIGS. 8A to 8C are timing charts for explaining the operation of the reading unit 50, in which FIG. 8A is a timing chart showing the data which is read from the memory 30 and input to the reading unit 50 and the data output from the first to seventh delay elements 51 to 57; FIG. 8B is a timing chart showing the data output from the eighth delay element 58 as the video data output; and FIG. 8C is a timing chart showing the CFI signal output selected at the selector 59.

Note that it is assumed that the video data and CFI signal which are converted to 8-bit data by the method as explained before referring to FIG. 5 and FIG. 6 are recorded in the memory 30.

First, the reading unit 50 receives as input the data shown in FIG. 8A read from the memory 30. Further, although not illustrated, the corresponding horizontal synchronization signal HD when viewing the data read from this memory 30 as video data is input to the selection signal generator 60.

The data input to the reading unit 50 is sequentially shifted through the first to seventh delay elements 51 to 57 as shown in FIG. 8A. Further the output of the seventh delay element 57 is input to the eighth delay element 58, thereby obtaining the video data output shown in FIG. 8B.

Here, when the 1433rd video data (data No. 1432) where the corresponding CFI signal becomes a valid signal is output from the eighth delay element 58, the data A obtained by converting the first eight bits of data of the valid CFI signal to a parallel format in FIG. 8 is input to the reading unit 50. Accordingly, at this time, if the selection signal generator 60 selects a selection signal for selection of the signal of the bit 0 of the input data, selects the data of LSB thereof at the selector 59, and outputs this by a CFI signal, the signal of the data No. 0 of the CFI signal will be output in correspondence to the data of the data No. 1432 and the original 9-bit data will be restored.

At the next clock, the contents of the first to eighth delay elements 51 to 58 are shifted one by one, and the 1434th video data (data No. 1433) is output from the eighth delay element 58. At this time, the data A input at the previous clock has been input to the first delay element 51, and the data of the bit 1 of this first delay element 51 has been input to the selector 59. Accordingly, the selection signal generator 60 generates a selection signal that selects the data of the bit 1 of this first delay element 51 and outputs the same to the selector 59. As a result, the data of the data No. 1433 is output from the eighth delay element 58, the CFI signal of the data No. 1 is output from the selector 59, and these are output from the reading unit 50.

By similarly processing the data later, the video data and CFI signal input to the memory device 1 as shown in FIG. 8B and 8C are restored and output from the memory device 1.

In this way, in the memory device 1 of the present embodiment, by processing the 1-bit CFI signal to 8 bits and inserting the same in the invalid period from EAV to SAV of the video data, the original 9-bit data is converted to 8-bit data and can be recorded in a memory 30 of an 8× configuration.

As a result, the memory used for variable speed reproduction in an A/V server can be efficiently constituted.

Further, as a result, the required number of memory ICs is reduced and costs can be reduced.

Note that, the present invention is not limited to the present embodiment. Various modifications are possible.

For example, the concrete example explained referring to FIG. 5 to FIGS. 8A to 8C related to video data of the 525/60 system, but it is apparent that similar processing can be carried out also with respect to video data of the 625/50 system. In the 625/50 system, it is sufficient to change the amount of delay of the signal at the time of conversion by the amount of difference of the timing relationships of the main video data and CFI signal with the 525/60 system.

Further, the writing unit 10 and the reading unit 50 are not limited to the concrete configurations explained referring to FIG. 5 to FIG. 7.

The present invention is characterized in that a 9-bit signal is converted to 8-bit data by converting the CFI signal from a serial data to a parallel data format and inserting the same into the invalid region of the video data. Accordingly, any method of the serial-to-parallel conversion and any method of the parallel-to-serial conversion at the time of restoration may be used.

According to the memory device of the present invention, 9-bit video data can be efficiently recorded and reproduced by using a commonly used memory IC such as a memory IC with 8-bit input/output data.

While the invention has been described by reference to specific embodiments chosen for purposes of illustration, it should be apparent that numerous modifications could be made thereto by those skilled in the art without departing from the basic concept and scope of the invention.

What is claimed is:

1. A memory device for recording 9-bit data including 8-bit video data having a predetermined invalid period and 1-bit color frame information data, comprising:

a serial-to-parallel converting means for converting a valid data part of said 1-bit color frame information data to 8-bit data;

a recording data selecting means for selecting said 8-bit video data when said video data is valid, and selecting said converted 8-bit color frame information data when said video data is invalid and said converted 8-bit color frame information data exists;

a memory means for storing said selected 8-bit data wherein data width for inputting and outputting is a whole multiple of 8 bits;

a reproducing means for reproducing the 8-bit data stored in said memory means;

a parallel-to-serial converting means for converting said reproduced 8-bit data to a substantially 1-bit data train; and a 9-bit data generating means for adding said converted 1-bit data train to the corresponding 8-bit video data when said converted 1-bit data train is the valid data part of said color frame information data.

2. A memory device as set forth in claim 1, wherein said serial-to-parallel converting means comprises;

a shift register means for shifting successively and storing said 1-bit color frame information data having seven 1-bit memory means or more connected in series, and a data extracting means for extracting predetermined continuous 8 bits from said 1-bit color frame information data input to said shift register means or stored in said shift register means.

3. A memory device as set forth in claim 1, wherein said recording data selecting means detects a valid period and an invalid period of said 8-bit video data based on a horizontal synchronization signal of said 8-bit video data and carries out said selection in response to said detected periods.

4. A memory device as set forth in claim 1, wherein said recording data selecting means comprises a counter for detecting elapsed time from transforming a horizontal synchronization signal of said 8-bit video data and the time when said video data is detected as invalid; and said converted 8-bit color frame information data is provided in response to said detected elapsed time.

5. A memory device as set forth in claim 1, wherein said parallel-to-serial converting means comprises;

a shift register means for shifting successivelys and storing said reproduced 8-bit data having seven 8-bit memory means or more connected in series, and a data extracting means for extracting predetermined 1-bit data from each of predetermined continuous eight 8-bit data input to said shift register means or stored in said shift register means and generating 1-bit data train.

6. A memory device as set forth in claim 1, wherein said 9-bit data generating means detects a valid data part of said color frame information data based on a horizontal synchronization signal of said video data and adds said detected valid data part to said video data.

7. A memory device as set forth in claim 1, wherein said color frame information data includes information indicating a field of the video data.

8. A memory device as set forth in claim 1, wherein said memory means comprises synchronous DRAMs.

9. A memory device for recording 9-bit data including 8-bit video data having a predetermined invalid period and 1-bit color frame information data, comprising:

a serial-to-parallel converting means for converting a valid data part of said 1-bit color frame information data to 8-bit data;

a recording data selecting means for selecting said 8-bit video data when said video data is valid and selecting said converted 8-bit color frame information data when said video data is invalid and said converted 8-bit color frame information data exists; and a memory means for storing said selected 8-bit data wherein data width for inputting and outputting is a whole multiple of 8 bits.

10. A memory device, comprising:

a storage means for storing 1-bit color frame information data of which valid data part is converted to 8-bit data and multiplexed to 8-bit video data in the invalid data part of the same wherein data width for storing and reproducing is a whole multiple of 8 bits;

a reproducing means for reproducing the 8-bit data stored in said memory means;

a parallel-to-serial converting means for converting said reproduced 8-bit data to a substantially 1-bit data train; and a 9-bit data generating means for adding said converted 1-bit data train to the corresponding 8-bit video data when said converted 1-bit data train is the valid data part of said color frame information data.

\* \* \* \* \*